United States Patent

Gonzalez et al.

[11] Patent Number: 5,966,443
[45] Date of Patent: Oct. 12, 1999

[54] METHOD FOR CORRECTING SUBSCRIBER-BASED SECURE CALL KEYS

[75] Inventors: Eduardo Gonzalez, San Antonio, Tex.; John M. Gilbert, Lake Zurich, Ill.

[73] Assignee: Motorola, Inc., Schaumburg, Ill.

[21] Appl. No.: 08/640,418

[22] Filed: Apr. 30, 1996

[51] Int. Cl.[6] .................................................. H04L 9/08
[52] U.S. Cl. .............................................. 380/21; 380/49
[58] Field of Search .................................. 380/21, 49, 23, 380/25; 455/410, 411

[56] References Cited

U.S. PATENT DOCUMENTS

| | | | |
|---|---|---|---|
| 5,093,860 | 3/1992 | Steinbrenner et al. | 380/21 |
| 5,222,137 | 6/1993 | Barrett et al. | 380/21 |
| 5,404,404 | 4/1995 | Novorita | 380/21 |
| 5,481,610 | 1/1996 | Doiron et al. | 380/21 |

*Primary Examiner*—Gail O. Hayes
*Assistant Examiner*—Anthony DiLorenzo
*Attorney, Agent, or Firm*—George C. Pappas; Susan L. Lukasik

[57] ABSTRACT

A key variable correction scheme allows errored encryption key material in mobile and portables radios to be quickly identified and corrected. The errored encryption material can be corrected automatically by a key management controller, once detected. Consequently, a mismatch problem can be diagnosed and resolved in a manner which is automatic, therefore quick and efficient, and in a way which overcomes the difficulty which users have in identifying by themselves a mismatch condition since the result is often only silence out of their respective radio speaker. Once the mismatch is corrected by the reassignment of correct keys, the user is free to join the radio call already in progress.

18 Claims, 3 Drawing Sheets

METHOD FOR CORRECTING SUBSCRIBER-BASED SECURE CALL KEYS

FIELD OF THE INVENTION

The present invention relates generally to encryption key variable selection and management in secure wireless communication systems and, in particular, to a method for correcting subscriber-based secure call keys.

BACKGROUND OF THE INVENTION

Wireless communication systems are well-known. Such systems typically include a plurality of communication units that transceive wireless communication resources with each other and a fixed infrastructure. The fixed infrastructure typically comprises base stations/repeaters that also transceive the wireless communication resources. In some systems, such as a PRIVACY PLUS® system by Motorola, Inc., the base stations operate under the direction of a central controller that controls allocation of the wireless communication resources. Regardless, it is often the case that the communication units include various communication unit parameters used for their normal operation. An example of such a parameter is an encryption key, as known in the art, used for the encryption and decryption of digitally transmitted voice and data communications.

Many of the parts of a public safety land mobile radio communications system will use encryption to protect the information which is sent through the system. The encryption algorithm requires keys in order to protect the confidentiality of this information. The process by which these encryption keys are generated, stored, protected, transferred, loaded, used and destroyed is known as key management. In order to maintain system security, there are known methods for protecting these keys from disclosure including frequent or periodic updating or replacement.

Oftentimes, a portable or mobile radio is assigned an incorrect or improper encryption key variable. Failure to detect and correct an improper encryption key variable results in the inability for the subscriber radio to transmit or receive in the encrypted mode.

In first generation secure radio systems, an improper key variable would result in either unintelligible noise or silence coming from the radio speaker. The operator would need to realize that he was not receiving and verbally request that the call continue in the unencrypted or "clear" mode. At the earliest possible time (shift change usually), the user would return to have the proper key variable loaded by physically connecting the mobile or portable radio to a handheld key variable loader. This loader device would electronically program the mobile or portable radio.

In modern day, second generation secure radio systems, an improper key variable still results in either unintelligible noise or silence coming from the radio speaker. The user now, however, has the additional capability of requesting that his radio have the key updated by a "rekey request" message being sent over the air to a "key management controller" (KMC). The KMC would then respond to the subscriber rekey request by sending a new key via an encrypted data message. This process is known as over-the-air rekeying (OTAR) and is a secure way of encrypting and sending new encryption keys and other related key management messages through an air interface in such a way that they are protected from disclosure and unauthorized modification.

In modern systems, when subscriber units communicate with the central controller, because the central controller has the ability to monitor a voice channel logical ID (LID) and to identify key variable information transmitted from a particular subscriber unit, the central controller can automatically recognize a mismatch condition between the variable key transmitted by a subscriber unit and key information stored in a key variable database maintained by the central controller. Presently, however, when a mismatch is detected, the problem is merely logged for later consideration by the system administrator (or console operator). The system administrator may wish to correct a mismatch condition, but at the present there is no facility to allow this to occur automatically ("on the fly") so that communications can continue.

Similarly, in direct link communications between subscriber units, i.e., between portable and/or mobile radios, each transceiving subscriber unit exchanges LID information with the other and upon receipt of an invalid LID from a communicating subscriber unit, presently, automatically mutes audio during an encrypted voice channel call. Thus, there is a need, even in this situation, for automatic correction of the secure call key variable once mismatch is detected.

The prior solutions all fail to alert the mobile/portable radio user or the console operator to the existence of a key mismatch problem. Because improper or mismatched keying material can result in silence out of the radio speaker, this condition can be difficult for radio operators to become aware of. There is a need for a solution that alerts the mobile/portable radio users or the key management controller to the existence of a key mismatch problem.

There is also a need for a solution that (a) does not require manual intervention by a radio user or console operator and (b) overcomes the mismatch problem in a speedy and efficient manner so that secure communications can resume as quickly as possible.

DESCRIPTION OF THE PREFERRED EMBODIMENTS

In general, the present invention provides a method for automatically correcting improper encryption keying material in radio subscribers, in a most efficient manner, and with minimal or no operator intervention.

Figure 1:
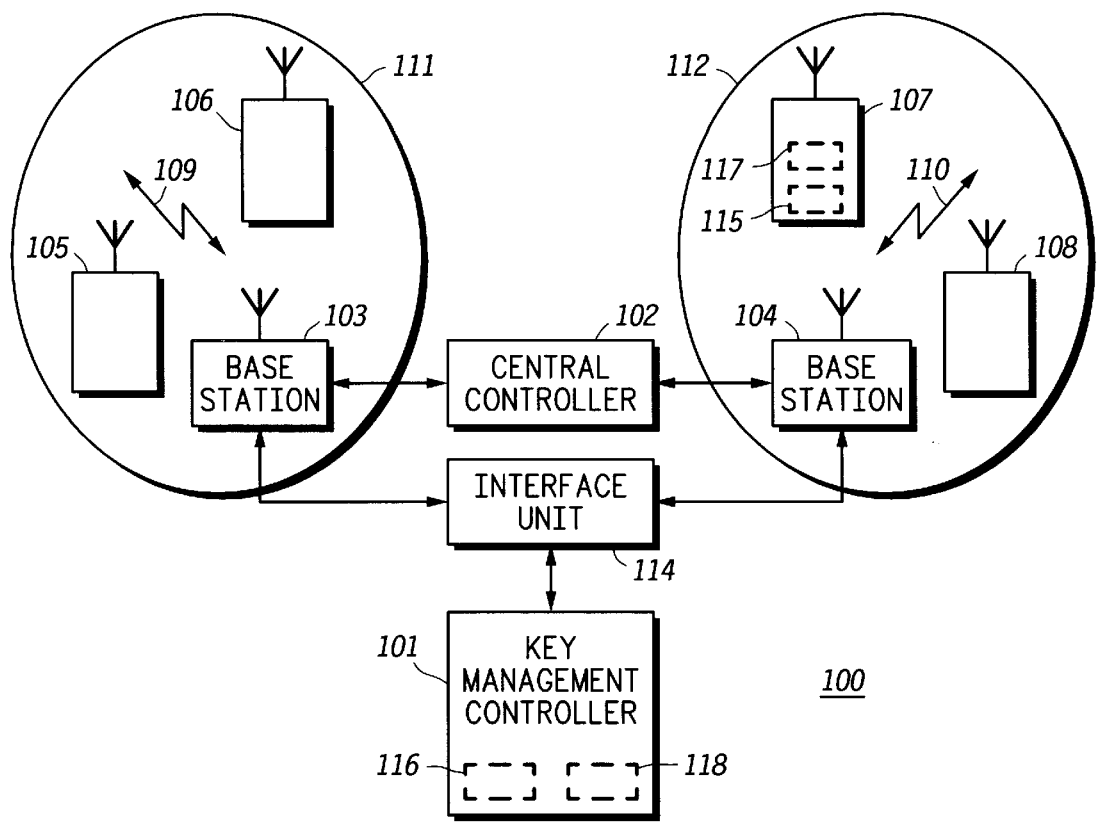
FIG. 1 is a block diagram of a wireless communication system that incorporates a key management controller.

The present invention can be more fully described with reference to FIGS. 1–4. FIG. 1 is a block diagram of a wireless communication system 100 that incorporates a key management controller (KMC) 101. The wireless communication system 100 also comprises a central controller 102, base stations 103–104, a plurality of communication units 105–108, and wireless communication resources 109–110. In systems operating as trunked communication systems, the central controller 102 controls the allocation of the wireless communication resources 109–110. The wireless communication resources 109–110 may comprise radio frequency (RF) channels such as pairs of frequency carriers, time-division multiplexed (TDM) slots, or any other RF transmission media.

Each base station 103–104, which can be a QUANTAR™ base station by Motorola, Inc., in transceiving the wireless communication resources 109–110 with the communication units 105–108, establishes a corresponding coverage area 111–112. For the sake of clarity, two base stations are shown; in practice any number of base station can be used. In a preferred embodiment, the communication units 105–108 comprise in-hand portable units and/or in-car mobile units capable of encrypted two-way communications, such as ASTRO™ SPECTRA® radios by Motorola, Inc., and are capable of receiving commonly (i.e., group-wide) or individually addressed messages. Although shown in only one for simplicity, each communication unit 105–108 includes memory 115, such as random access memory (RAM) and/or read-only memory (ROM), and a processor 117, such as a microprocessor and/or digital signal processor.

The KMC 101 communicates with the base stations 103–104 via one or more interface units 114 (only one shown). Suitable key management controllers and interface units are known in the art. The key management controller 101 includes memory 116 and a processor 118 that are, at a minimum, as functionally capable as the memory 115 and processor 117 used in the communication units 105–108. The memories 115–116 and processors 117–118 are used in accordance with well known programming techniques for the storage and execution of software algorithms. In a preferred embodiment, the key management controller 101 generates and stores at least one encryption key in accordance with known encryption techniques. Furthermore, the key management controller 101 generates an encryption map index, as described below.

Figure 2:
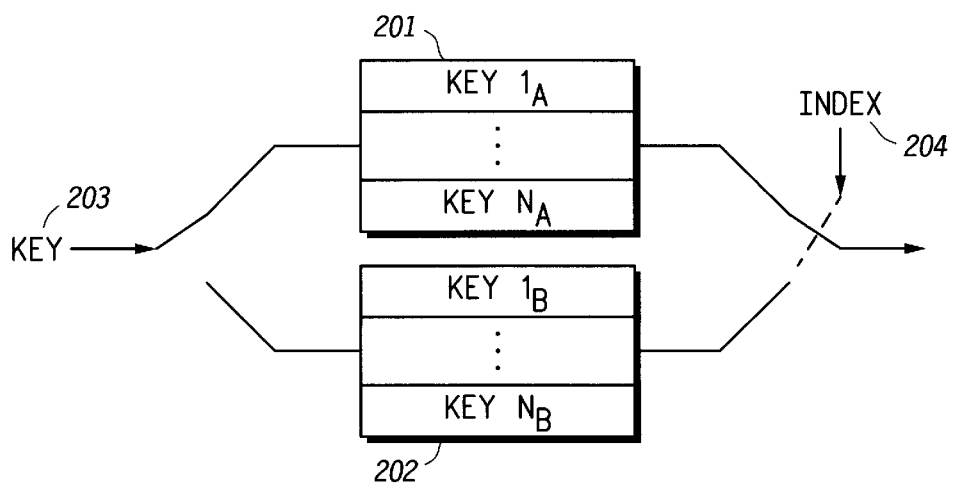
FIG. 2 is a block diagram illustrating storage and selection of encryption keys.

FIG. 2 is a block diagram illustrating storage and selection of encryption keys. The storage and selection shown is implemented using the memories 115 and processors 117 included in each of the communication units 105–108. As shown, a first encryption map 201 and a second encryption map 202 are provided, although any number of such encryption maps could be used. The first encryption map 201 includes a plurality of encryption keys labeled "KEY $i_A$" and the second encryption map 202 includes a plurality of encryption keys labeled "KEY $i_B$", where i=1 to N. As one or more updated encryption keys 203 are received via a group or individual update message, they are stored in either of the encryption maps 201–202. An encryption map index 204 is also received as a communication unit parameter used to indicate that encryption map from which encryption keys are to be selected for the encryption/decryption of voice and data communications. In this manner, keys can be updated without temporarily interrupting encrypted voice and data communications.

Figure 3:
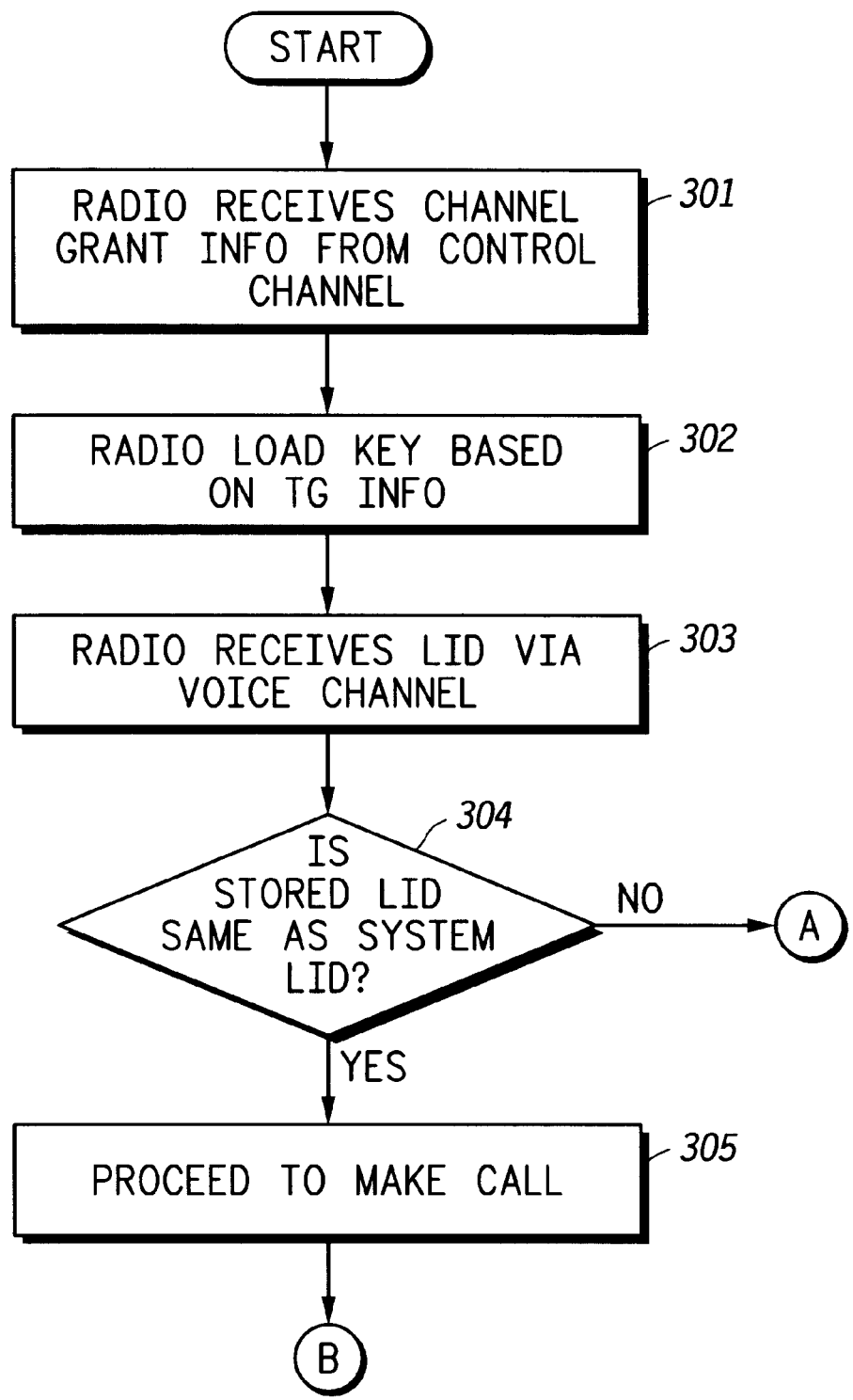
FIGS. 3 and 4 are a flow chart for correcting a key variable mismatch problem in accordance with the present invention.
Figure 4:
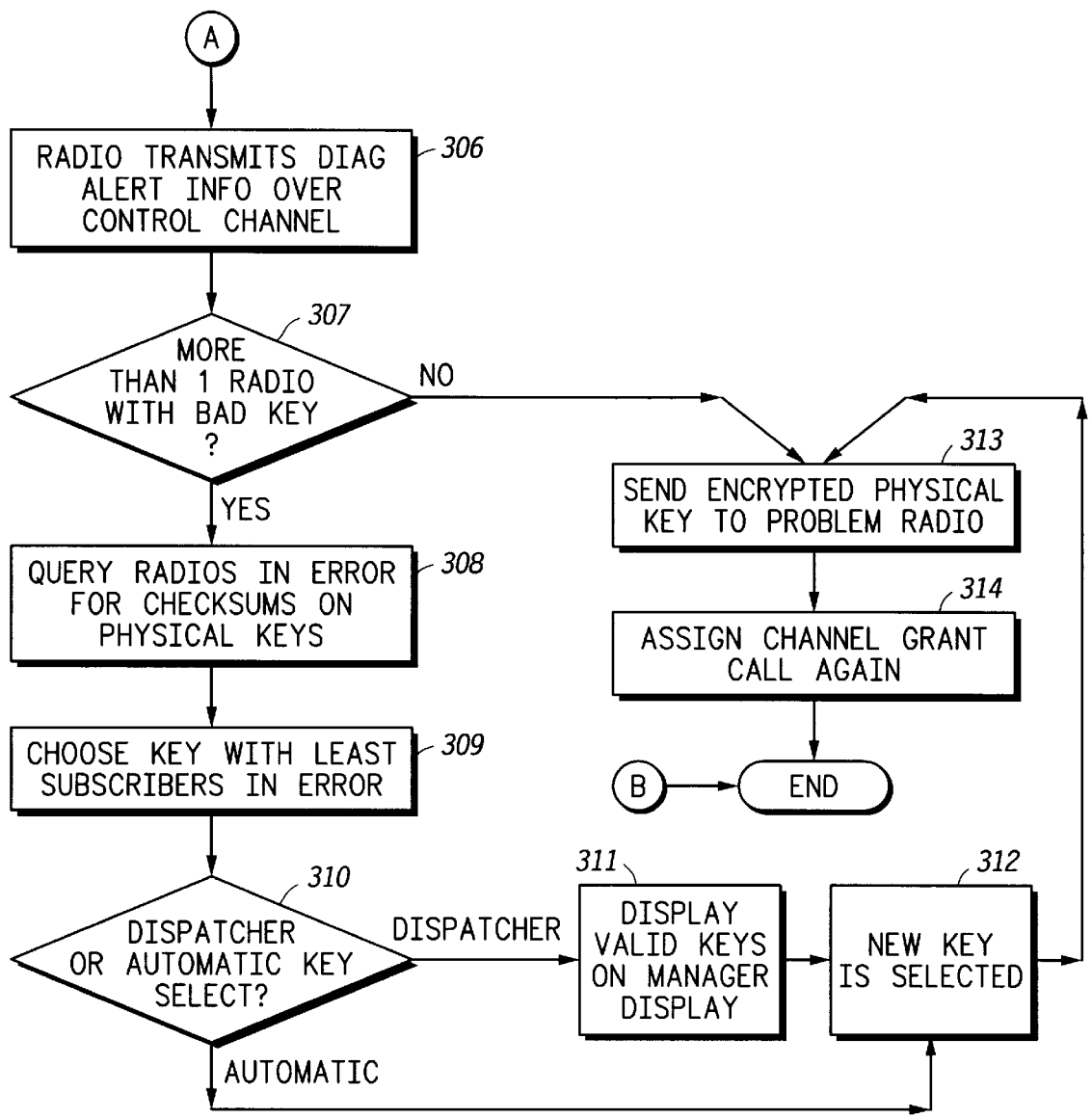

The present solution for automatically correcting improper encryption keying material in radio subscribers, will now be described with reference to the flow chart depicted in FIGS. 3 and 4, as embodied in a "trunked" radio environment. It should be appreciated, however, that the present embodiment is applicable to "conventional" systems as well. The word "radio", as used hereinafter, is synonymous with subscriber unit.

At step 301, a radio first receives a channel grant from a trunking system, signaling the radio to move to a specified voice channel to begin voice or data communications. At this time, the radio also receives information specifying the group (talkgroup=TG) of radios that will be participating in the conversation on the channel.

The radio then loads the encryption key material that is associated with the specified talkgroup (302). This key variable is loaded from radio key memory into the radio encryption device.

The transmitting radio sends digital voice information encrypted with an identical key variable. Embedded in this voice-data stream is a logical ID or "LID" (303). The LID is not derived from the key variable information, but will uniquely identify a single key variable used in the radio system.

At step (304), the radio compares the LID received on the digital voice channel with the expected LID stored in its database at the time of radio key variable programming.

When the LID received over the voice channel matches the LID stored in the radio memory (305), the call can continue and the encrypted digital voice decoded.

When the LID received over the voice channel does not match the LID stored in the radio memory (jump to routine A), the radio will transmit a diagnostic alert to the key management controller 101 (step 306). This alert will specify the individual ID of the radio that is experiencing the error (and possibly a checksum or LID of the key in error when this is not done as at step 308).

The KMC 101 will then check and see how many radios are reporting a LID mismatch error (307).

When only a single radio is reporting the error, the KMC 101 will send a new key variable to the radio inside an encrypted data message (313).

The system will then assign voice channels and attempt to begin the call again or add the single radio to the call in progress (314).

In the event multiple radios have reported LID mismatch errors, the system will query radios in error for a checksum for all its keys or the specific LID of the keys in error (308).

The KMC 101 will then attempt to choose the key variable in use by the most subscribers (105–110). This can be done two ways: either automatically or manually.

When the automatic selection mode is in use, the KMC 101 selects (312) the key used by the largest number of subscribers. The KMC 101 then sends (313) the new key variables to the errored radios inside encrypted data messages. In the event there are multiple keys that could be used to remedy the situation, they can be optionally presented to an operator for selection (311).

The above described key variable correction scheme allows errored encryption key material in mobile and portables radios to be quickly identified and corrected. The errored encryption material can be corrected automatically by the KMC 101, once detected. Consequently, a mismatch problem can be diagnosed and resolved in a manner which is automatic, therefore quick and efficient, and in a way which overcomes the difficulty which users have in identifying by themselves a mismatch condition since the result is often only silence out of their respective radio speaker. Once the mismatch is corrected by the reassignment of correct keys from either the KMC 101 ("trunked system") or by another radio ("conventional system"), the user is free to join the radio call already in progress.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a wireless communication system including a plurality of RF sites, a key management controller (KMC) and at least one transmitting radio and one problem receiving radio, a method for automatically correcting an erroneous encryption key variable stored in a memory in the problem receiving radio, the method comprising the steps of:

receiving, by the problem radio, an indication from the transmitting radio for secure communications therebetween including receiving a logical ID uniquely identifying a secure key variable to be used in the communication;

comparing, by the problem radio, the received logical ID with an expected logical ID stored in the memory of the problem radio;

when the compared IDs are different, transmitting, by the problem radio, a diagnostic alert to the KMC; and automatically transmitting, by the KMC, a new encryption key variable to the problem radio.

2. The method of claim 1, wherein said step of automatically transmitting comprises the steps of:

determining whether there is more than one radio transmitting a diagnostic alert; and when more than one radio is transmitting a diagnostic alert, identifying the problem radio among the more than one radios as the one requiring the new encryption key variable.

3. The method of claim 2, wherein said wireless communication system is a trunked communication system.

4. The method of claim 2, wherein said wireless communication system is a non-trunked communication system.

5. The method of claim 2, wherein said diagnostic alert includes key variable information, said step of identifying the problem radio when more than one diagnostic alert is received comprising the steps of comparing the diagnostic alert information from each of the radios and determining a new key variable on the basis of the comparison.

6. The method of claim 5, wherein said wireless communication system is a trunked communication system.

7. The method of claim 5, wherein said wireless communication system is a non-trunked communication system.

8. The method of claim 5, wherein the key variable information transmitted by each radio includes an individual key variable, the step of determining a new key variable including the step of selecting one of the individual key variables transmitted from the radios.

9. The method of claim 8, wherein said wireless communication system is a trunked communication system.

10. The method of claim 8, wherein said wireless communication system is a non-trunked communication system.

11. The method of claim 8, wherein the step of selecting one of the individual key variables involves selecting a key variable in use by most subscribers.

12. The method of claim 11, wherein said wireless communication system is a trunked communication system.

13. The method of claim 11, wherein said wireless communication system is a non-trunked communication system.

14. The method of claim 8, wherein the step of selecting one of the individual key variables includes the step of displaying at least some of the key variables for selection of the new key variable by a console operator.

15. The method of claim 14, wherein said wireless communication system is a trunked communication system.

16. The method of claim 14, wherein said wireless communication system is a non-trunked communication system.

17. The method of claim 1, wherein said wireless communication system is a trunked communication system.

18. The method of claim 1, wherein said wireless communication system is a non-trunked communication system.

* * * * *